United States Patent [19]
Faulhaber et al.

[11] Patent Number: 5,485,281
[45] Date of Patent: Jan. 16, 1996

[54] RASTER IMAGE PROCESSING WITH PIXEL MAPPING TO ALLOW IMAGE BORDER DENSITY ALLOCATION

[75] Inventors: Mark E. Faulhaber, Wilmington; Mark A. Momcilovich, Newark, both of Del.

[73] Assignee: E. I. Du Pont de Nemours and Company, Wilmington, Del.

[21] Appl. No.: 922,654

[22] Filed: Jul. 31, 1992

[51] Int. Cl.$^6$ .................................................. H04N 1/40
[52] U.S. Cl. ........................ 358/451; 358/456; 358/463
[58] Field of Search ................................. 358/440–458, 358/230, 240, 298, 283, 463, 300, 75, 466, 465, 467, 468, 262; 364/520, 518, 521; 395/134, 135; 340/793, 731, 748, 750, 747

[56] References Cited

U.S. PATENT DOCUMENTS

| | | | |
|---|---|---|---|
| 4,052,699 | 10/1977 | Micka et al. | 340/146.3 |
| 4,531,160 | 7/1985 | Ehn | 358/240 |
| 4,695,884 | 9/1987 | Anastassiou et al. | 358/163 |
| 4,752,894 | 6/1988 | Deering et al. | 364/520 |
| 4,863,553 | 9/1989 | Kawamata | 340/731 |
| 4,920,501 | 4/1990 | Sullivan et al. | 358/46.3 X |
| 4,952,920 | 8/1990 | Hayashi | 340/727 |
| 4,982,345 | 1/1991 | Callahan et al. | 364/521 |
| 5,020,119 | 5/1991 | Tai et al. | 382/50 |
| 5,020,124 | 5/1991 | D'Aoust et al. | 382/61 |
| 5,029,226 | 7/1991 | Klein et al. | 382/50 |
| 5,077,808 | 12/1991 | Kumagai | 382/18 |
| 5,214,519 | 5/1993 | Faulhaber et al. | 358/451 |
| 5,253,082 | 10/1993 | Hayashi et al. | 358/456 |
| 5,278,950 | 1/1994 | Takei et al. | 395/134 |

FOREIGN PATENT DOCUMENTS

| | | |
|---|---|---|
| 0200282 | 11/1986 | European Pat. Off. . |
| 0549316 | 6/1993 | European Pat. Off. . |

*Primary Examiner*—Paul Ip

[57] ABSTRACT

A method and apparatus for generating raster image information for displaying both images and border areas in a single display comprising selecting one of a predetermined number of density values available for the image display to represent the border areas and remapping the image densities to the remaining density values.

7 Claims, 3 Drawing Sheets

RASTER IMAGE PROCESSING WITH PIXEL MAPPING TO ALLOW IMAGE BORDER DENSITY ALLOCATION

BACKGROUND OF THE INVENTION

1. Field of the Invention

This invention relates to a method and an apparatus for generating raster lines for displaying multiple images on a single film sheet and more particularly, to a method and an apparatus for generating raster lines that include both image and image border information.

2. Description of the Prior Art

In the medical diagnostic imaging environment it is often desirable to combine and display a number of images representing different views of a given subject on a single sheet for review by a physician. The images may originate from various sources such as CAT-scans, NMR, radiography etc. and kept in a library of images in digital format. The images may be of different sizes and formats. An appropriate technology for formatting such images in an optimal way as to most efficiently use the available display area is disclosed in copending application Ser. No. 07/692,654, filed Apr. 29, 1991 in the names of Faulhaber and Taylor (IM-0406), now U.S. Pat. No. 5,214,519, and assigned to the assignee of the present application. This last-mentioned application describes a method and apparatus for capturing and displaying multiple medical diagnostic images stored in digital form on a single sheet of, typically, photographic film.

In order to operate at high speeds and to tie up a computer network as briefly as possible, information for each image is transmitted to a dedicated printer, often referred in the medical diagnostic field as a "camera", for generating a hard copy for study. The information is usually transmitted in serial format over a communication network and is received by the printer and stored in a memory, without undergoing any mapping process. The printer is able to receive and store enough information to produce a complete sheet. The information received typically includes, in addition to actual image data, instructions for image layout and display, instructions regarding border and if desired line framing.

The hard copy is produced in the camera by exposing a photosensitive film sheet in a laser type scanner, in raster fashion with information contained in the printer memory. In displaying the images, it is highly desirable to provide distinct borders separating each image from the background. Since the information in the memory is not provided in a format ready for raster display, a rasterization process must occur in the printer prior to the printing of the images. This rasterization process must obtain information both from different image sources and from border instructions and supply the appropriate exposure commands for each line, pixel by pixel to the film exposure device. i.e. a laser beam. It is highly desirable to effectuate such rasterization as rapidly as possible with minimal computation, preferably in hardware, and to produce a visually pleasing display, especially one in which the images are visually readily distinguished from background areas such as borders, so as not to confuse the observer.

SUMMARY OF THE INVENTION

In one aspect the present invention is directed to a method for displaying images from digital data representing a first predetermined number of image density levels, together with border areas, comprising:

(a) selecting one of said first predetermined number of image density levels to represent a preselected border density level;

(b) mapping the digital data representing the first predetermined number of image density levels to a second predetermined number of image density levels, the second predetermined number of image density levels excluding the level selected in step (a); and (c) displaying said images using said second number of image density levels and displaying said border areas using said selected one of said first number of image density levels.

Preferably the selected value for the border areas is the lowermost image value and all lowermost values are mapped to the next higher digital image value. The image data may be stored in a printer memory wherefrom it is recovered pixel by pixel and line by line with image and border pixel information accessed sequentially just prior to being applied to a film exposing device. Further more, the mapping step is preferably conducted as each pixel value is recovered from said memory and prior to its application to the film exposing device.

In another aspect the present invention is directed to an apparatus for displaying images from digital data representing a number of image density levels, together with border areas, comprising:

means for receiving image data;

image memory means connected to the means for receiving image data, for storing image pixel density data representing at least one image;

means for generating border pixel density data having a first predetermined density;

supply means connected to both the image memory means and the means for generating border pixel density data, for serially supplying both image and border pixel density data to a raster display means;

controlling means associated with said supply means for controlling the supply means to selectively supply border and image pixel density data;

remapping means associated with the storing means and the supply means for comparing each image pixel density supplied to said raster display means to the first predetermined density, and, if the image pixel density equals the first predetermined density, supplying to the display means a second predetermined density, different from said first predetermined density.

BRIEF DESCRIPTION OF THE DRAWINGS

The invention will be more fully understood from the following detailed description taken in connection with reference to the accompanying drawings in which.

DETAILED DESCRIPTION OF THE INVENTION

Throughout the following description reference will be made to the drawings in which similar numbers indicate similar elements.

Figure 1:
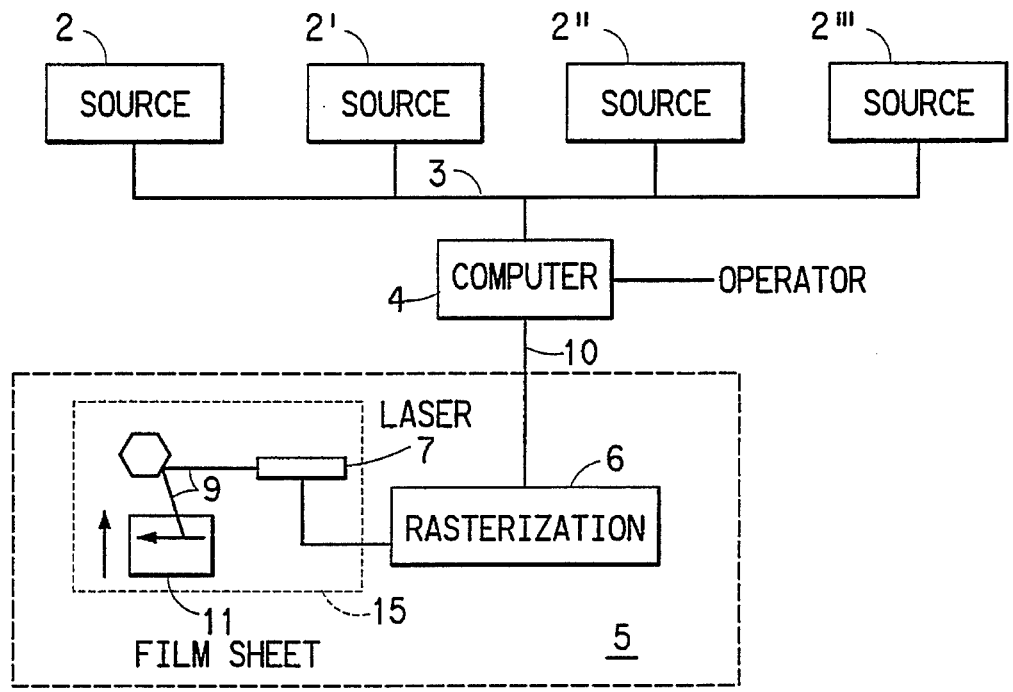
FIG. 1 shows a block diagram of an imaging system in which the present invention is used.

With reference to FIG. 1 there is shown an overall medical diagnostic imaging system in which the present invention may be employed. Images from various sources 2, 2', 2" etc. are directed over a communications network 3 to a controlling computer 4. The image information in computer 4 is captured and processed for display. Processing involves, inter alia, page making step in which multiple images are laid out on a predetermined size film sheet according to operator-input instructions in a manner as to optimize space utilization on the layout sheet. A detailed description of an image layout process is disclosed in the above-referenced copending application Ser. No. 07/692,654, mentioned above, while apparatus for implementing enlargements or reductions of the images, particularly for interpolating pixel values when such values are needed, is disclosed in copending application Ser. No. 07/692,655, filed Apr. 29, 1991 in the names of Momcilovich and Byrne (IM-0401), now U.S. Pat. No. 5,157,517, and also assigned to the assignee of this application.

After processing the image data and associated display instructions are forwarded from computer 4 to printer 5. Printer 5 comprises a rasterization module 6 and a film exposing device 15, which may include a laser source 7, an imaging beam 9 and appropriate film and beam drives to provide a raster scan exposure of a photosensitive film sheet 11.

Figure 2:
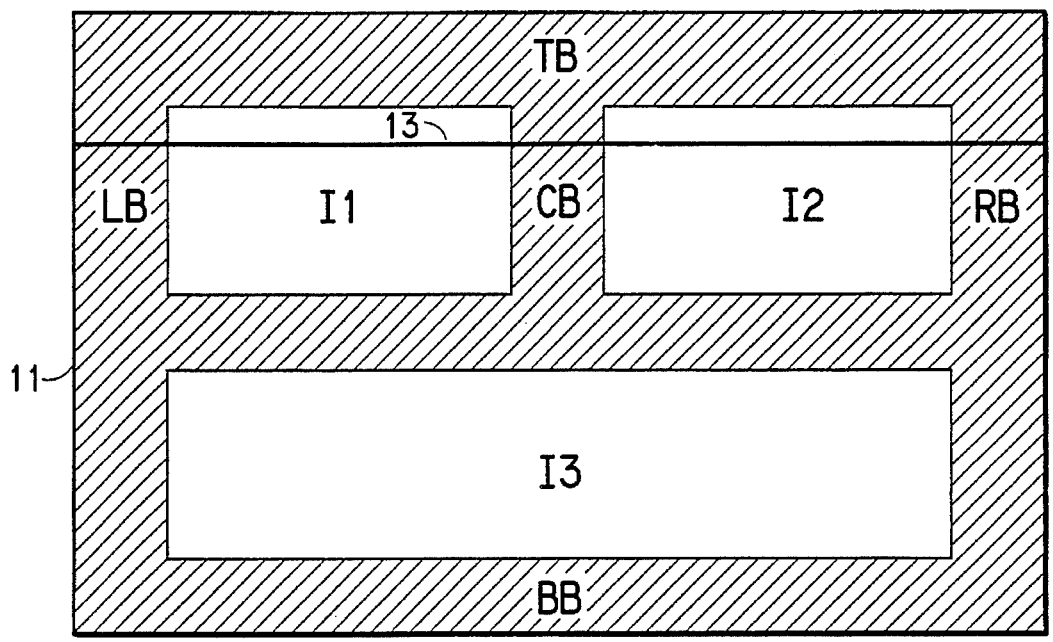
FIG. 2 shows a typical image display generated by the method of the present invention.

The type of image display produced by the printer is shown in FIG. 2 which shows a film sheet 11 on which have been placed three different image areas (I1, I2, and I3) with top, bottom, left and right borders (TB, BB, LB, and RB respectively), as well as inter image center borders (CB). It is desirable that the borders have a density different from the densities used in the image areas so that there will be no confusion as to where an image begins or ends. The image areas in the display will be referred to, here from, as "frames".

Figure 3:
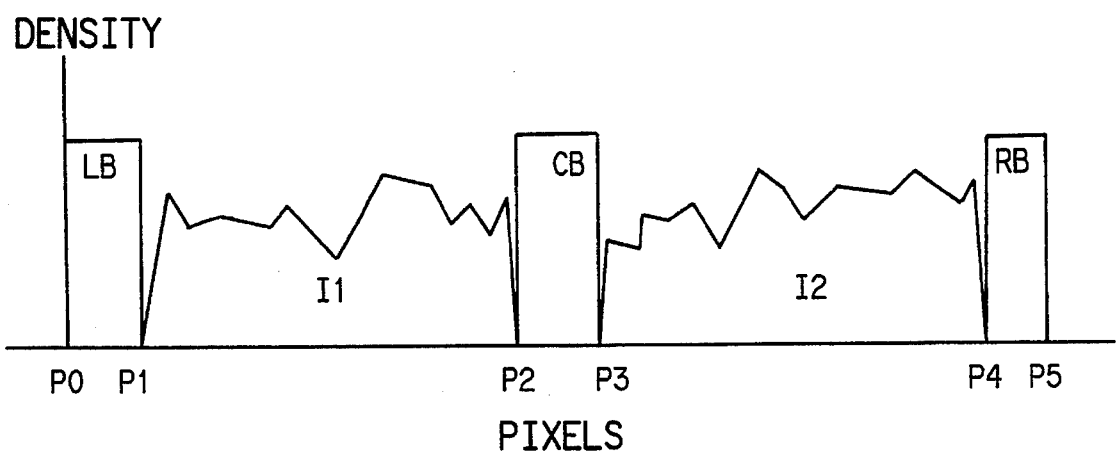
FIG. 3 shows a typical raster line assembled in accordance with this invention for driving an exposure device.

FIG. 3 shows a typical raster line 13 containing both border and image information typical of the raster lines used to produce the display shown in FIG. 2. As seen, the raster line is P5 pixels long and comprises a first density level portion corresponding to a predetermined pixel number P1 representing the left image border, a second portion containing actual image (density) data for a first frame, in which no pixel density has a value equal to the image border density, a second border portion P3-P2 corresponding to the space between the first frame and a second frame, image data for the second frame, and a right border portion density level P5-P4.

Figure 4:
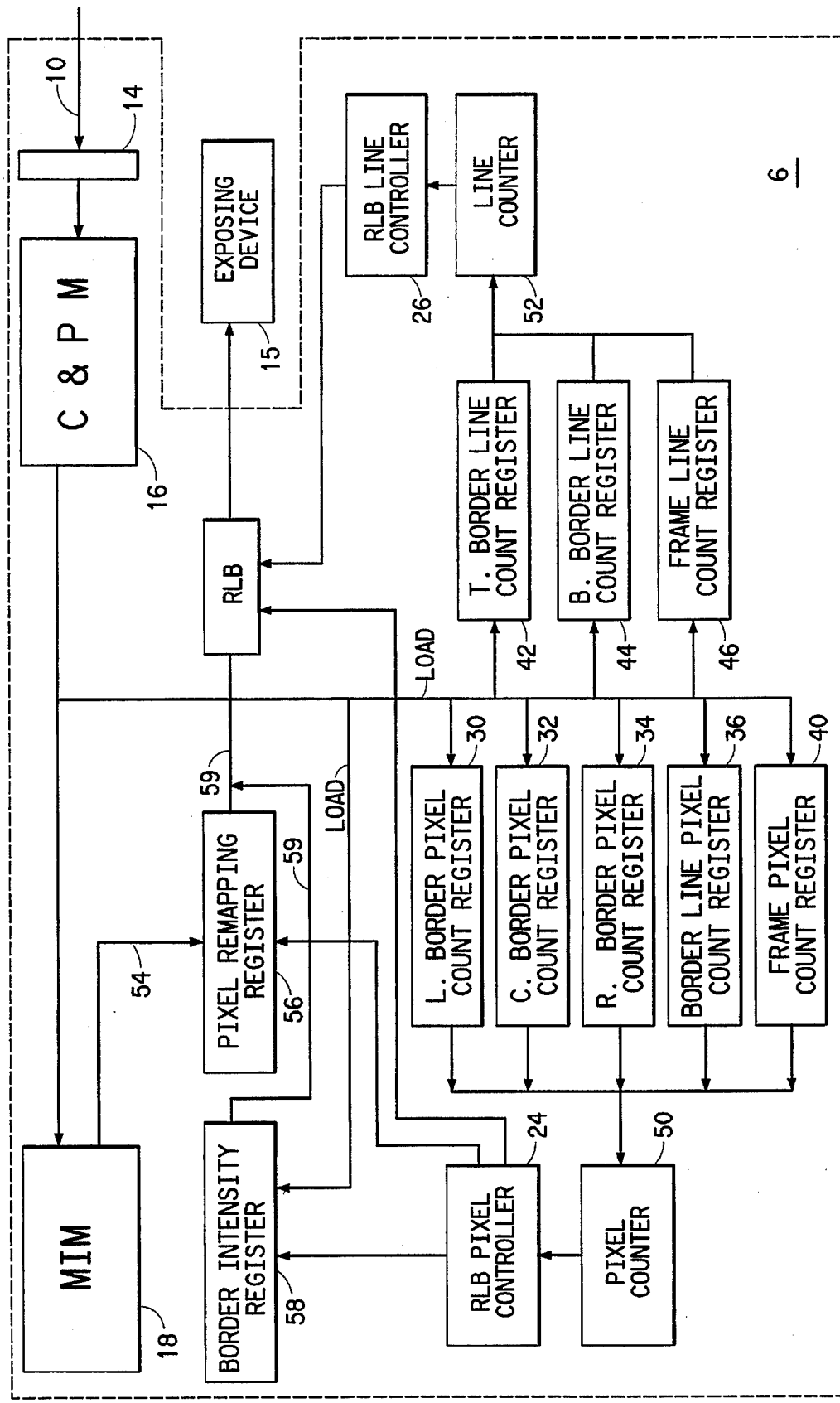
FIG. 4 shows a block diagram of apparatus for implementing the present invention.

Referring now to FIG. 4 there is shown a block diagram of the rasterization module 6 of FIG. 1 for generating a raster line as shown in FIG. 3 above. A communication link 10 connects computer 4 to a buss interface controller 14 for receiving incoming data from the computer 4. The buss interface output is directed to a collect and print manager 16 (C&P M) which includes a central processing unit (CPU) and a random access memory (RAM). The collect and print manager 16 controls the rasterization process.

The collect and print manager 16 receives and stores image display instructions, and controls a main image memory (MIM) 18 in which incoming image data are stored. The collect and print manager 16 [C&P M] controls two raster controllers, one a raster line buffer (RLB) pixel controller 24 for controlling the pixel flow to the printer, and the other a raster line buffer (RLB) controller 26 for controlling the line status.

A plurality of register counters connected to the collect and print manager 16 are used to speed the rasterization process by providing automatically a proper count of pixels for borders. Thus, as shown, there is a register 30 for the left border, a register 32 for the center border, and a register 34 for the right border. There is also a register 36 for counting pixels in border raster lines and a register 40 for counting frame pixels. Similarly, there is a register 42 for counting top border lines, a register 44 for counting bottom border lines and frame line counting register 46.

The collect and print manager 16 loads all registers with appropriate counts. The register output is directed to a pixel and a line counter 50 and 52, respectively, as appropriate. The output of those counters is directed to the pixel and line buffer controllers 24 and 26, respectively.

The main image memory 18 is connected over line 54 to a frame pixel intensity mapping register 56 which tests each density value for each pixel and if such density value is a preselected one, in this implementation a "0", replaces it by another preselected value, here a "1", in effect remapping the original image values to the values remaining after a preselected one is reserved for use as a border value.

A border intensity register 58 provides border pixels based on a pre-loaded count. The count is supplied from the computer 4 and loaded in the left, right, and center border pixel registers 30, 34, and 32, respectively. Pixel counter 50 keeps count of the pixels along the raster line and through controller 24 controls the output of registers 58 and 56. Both the mapping register 56 and the border pixel register 58 supply pixel information to the exposure device 15 over line 59.

In addition to the three registers 30, 32, and 34, there is one more register whose operation is directly related to the raster line counters, a border line pixel count register 36.

In operation, digital image data from a multiplicity of sources 2, 2' etc. comprising a library of images is accessed by computer 4 which calls up the images to be displayed on a particular film sheet. Operator input through the computer is provided regarding display format, i.e., how many images in a sheet, specific border instructions and whether the images will be displayed in portrait or landscape mode. Based on the image data and the operator instructions, computer 4 performs the necessary calculations determining the actual size and location where each image will be displayed on the film sheet, using, for instance, techniques such as described in above-referenced copending application Ser. No. 07/692,654.

The resulting data is transmitted over line 10 to the printer interface 14 and therefrom to the collect and print manager 16 (which includes a RAM and a CPU). Image data is separated and stored in the main image memory 18. Complete information for the exposure of at least one complete film sheet is received and stored by the collect and print manager 16, which processes this information and based on the instructions included regarding display prepares the sheet-layout. This means that the image is first divided into horizontal zones of images appearing side by side in a film sheet. In the FIG. 2 display, for instance, there are two zones, an upper zone where two images are displayed and a lower one where one image is displayed.

Each zone is then analyzed for frame size and border sizes. Pixel counts are loaded in the various registers for the borders and frames and in the line registers for the lines, for the first zone. The rasterization process begins and proceeds automatically by the decrementing of the counters. Thus, first the collect and print manager 16 preloads the line counter 52 with top border line count from register 42 and begins to decrement every time a raster line is completed.

Pixel counter 50 is loaded with border line pixel count from register 36 for a complete raster line. It decrements to "0" at the end of each line and is reloaded with the same border line pixel count from register 36 and the decrementing process repeats. When both the line counter 52 and the pixel counter 50 reach "0", the top border of the zone is complete.

The next raster line begins and from line count register 46 line count information is loaded into line counter 52. At the same time, the left border pixel count register 30 value is now loaded into pixel counter 50 which again begins decrementing to "0". When it reaches "0" controller 24 cuts off the border intensity register 58 and opens the frame pixel remapping register 56. This register sequentially supplies pixel values for a first frame. Preloaded frame pixel count register 40 together with pixel counter 50 determine how many pixel values will be directed over line 59 through pixel remapping register 56 to the exposing device 15. When counter 50 reaches "0" the raster line buffer pixel controller 24 again switches from register 56 to border intensity register 58 to provide border intensity values for a pixel number determined by the preloaded center border pixel counter register 32 and pixel counter 50. Pixels from the next image frame are then sent over line 59 and finally right border pixels from pixel count register 34, using the same technique are loaded in the counter 50 until the raster line buffer pixel counter 50 detects the end of the raster line based on the total number of pixels after which it restarts with the left border pixel count 30. Line counter 52 decrements to keep track of the line numbers that have been printed. The process continues until the line counter 52 has reached "0". The bottom border is composed in the same fashion as the top border but using bottom line count register 44. When both 50 and 52 reach "0", the printing of a zone has been completed whereupon the collect and print manager 16 reloads all counters with values for the next zone to be printed.

The process is thus automatic and self sustaining, and no calculation regarding address or pixel value is needed, except for initial pixel storage address in main image memory 18 for each frame.

To assure that no image pixel has the same density as a border area, the value of each pixel arriving in remapping register 56 is tested. If this value is a preselected one, then another preselected value from the total values available is sent on line 59.

In practice the preselected value is a "0" or a "255" (in an 8-bit system which is typically what is used in most diagnostic systems commercially available). If such a "0" or "255" value is encountered, a "1" or a "254" is transmitted instead. This is practically possible because very little information is carried by the diagnostic images at the two extremes of the density range and the minimal compression to the density scales is not objectionable. The above numbers are given as one illustration, and the "0" to "1" mapping is actually the preferred method for practicing this invention. However any other combination could be used, and it is conceivable to supply a "254" when a "0" is encountered and vice versa. It is also possible to do a complete image density remapping, where the original available 256 density values are remapped proportionately to 255 values, even though such system would be calculation intensive and is not considered particularly advantageous.

Figure 5:
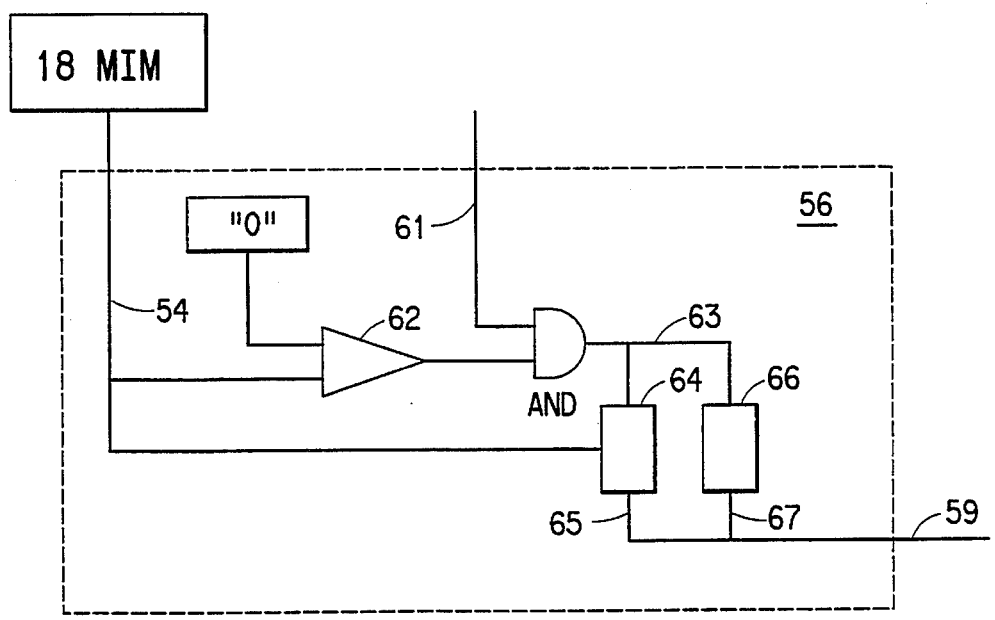
FIG. 5 shows a sample circuit for implementing the pixel remapping register in accordance with this invention.

A remapping circuit preferably used in the implementation of this invention corresponding to the block 56 for substituting a "1" for a "0" is shown in FIG. 5. Input data from main image memory 18 over line 54 is continuously compared in an eight-bit comparator 62 to a preselected value, i.e. "0". When an input "0" is detected by the comparator 62 and a signal appearing over line 61 indicating the pixel remapping is "on" is also asserted, the output of the "AND" gate enables register 66 and the preselected value, i.e. "1", supplied by register 66 appears over line 67 on the output line 59. When any value but the preselected, i.e., any value between "1" and "255" in this example, appears on line 54, the comparator through the "AND" gate enables the pass through register 64, which feeds the data directly from line 54 to line 59.

Those skilled in the art, having the benefit of the teachings herein above set forth, can effect numerous modifications thereto, which are to be construed as being encompassed within the scope of the present invention as set forth in the appended claims.

What is claimed is:

1. A method for displaying images from digital data representing a first predetermined number of image density levels, together with border areas, comprising:

(a) selecting one of said first predetermined number of image density levels to represent a preselected border density level;

(b) mapping the digital data representing the first predetermined number of image density levels to a second predetermined number of image density levels, the second predetermined number of image density levels excluding the level selected in step (a); and (c) displaying said images using said second number of image density levels and displaying said border areas using said selected one of said first number of image density levels.

2. The method in accordance with claim 1 wherein the selected density level in step (a) is a lowermost density level.

3. The method in accordance with claim 2 wherein the mapping step (b) comprises replacing all lowermost density levels in said first number of image density levels by a next higher density level to produce said second number of image density levels.

4. Apparatus for displaying images from digital data representing a number of image density levels, together with border areas, comprising:

means for receiving image data;

image memory means connected to the means for receiving image data, for storing image pixel density data representing at least one image;

means for generating border pixel density data having a first predetermined density;

raster display means for displaying an image;

supply means connected to both the image memory means and the means for generating border pixel density data, for serially supplying both image and border pixel density data to said raster display means;

controlling means associated with said supply means for controlling the supply means to selectively supply border and image pixel density data;

remapping means associated with the storing means and the supply means for comparing each image pixel density supplied to said raster display means to the first predetermined density, and, if the image pixel density equals the first predetermined density, supplying to the raster display means a second predetermined density, said second predetermined density being different from and conclusive of said first predetermined density.

5. The apparatus according to claim 4 further comprising a first plurality of count register means for providing said controlling means with predetermined counts indicative of border and image areas along a raster line.

6. The apparatus according to claim 5 further comprising a second plurality of count register means for providing said controlling means with predetermined counts of raster lines indicative of border and image areas.

7. The apparatus according to claim 4 wherein the remapping means is located between the image memory means and the supply means.

* * * * *